United States Patent [19]
Jakubowski

[11] 3,724,288
[45] Apr. 3, 1973

[54] HIGH ENERGY STORAGE FLYWHEEL
[76] Inventor: Marek Jakubowski, 7030 Roaring Ford Trail, Boulder, Colo. 80301
[22] Filed: Feb. 4, 1972
[21] Appl. No.: 223,633

[52] U.S. Cl. ..........................74/572, 74/25, 301/60
[51] Int. Cl. ..............................................F16c 15/00
[58] Field of Search ..........74/572, 574, 25; 64/27 S; 301/55, 60

[56] References Cited

UNITED STATES PATENTS

| 277,252 | 5/1883 | Ferguson | 301/60 |
| 860,336 | 7/1907 | Schultz | 74/572 |
| 1,203,267 | 10/1916 | Reeves | 74/574 |

Primary Examiner—Charles J. Myhre
Assistant Examiner—F. D. Shoemaker
Attorney—Frederick E. Bartholy

[57] ABSTRACT

A high energy storage flywheel is described, consisting of a rim of anisotropic material such as music wire. A divided hub has coaxially placed portions which are rotationally displaceable with respect to each other and are intercoupled by resilient means. Distinct sets of spokes connect the respective hub portions to the rim. By this construction the tension of the spokes due to the expansion of the rim upon rotation of the wheel is compensated by the mutual rotational displacement of the hub portions.

6 Claims, 5 Drawing Figures

PATENTED APR 3 1973

HIGH ENERGY STORAGE FLYWHEEL

FIELD OF THE INVENTION

This invention relates to power generating systems and, more particularly, to a kinetic energy storage and utilization device in the form of a flywheel.

DESCRIPTION OF THE PRIOR ART

The utilization of kinetic energy stored in a flywheel by virtue of its rotation and inertia has long been sought for as a power source. Lately, interest has been evoked in this form of energy in view of ecological problems posed by certain power sources which disperse polluting by-products into the atmosphere.

Various attempts have been made to construct a flywheel which would have the physical properties of withstanding the enormous stress imposed at the high velocity necessary to obtain useful energy storage.

In the July issue of "Mechanical Design and Power Transmission" there is presented a concept of using a flywheel as a secondary power source in connection with electric railways. The storage flywheel proposed in this scheme is of a double hyperbolic shape running in a vacuum chamber.

The application of a flywheel for the powering of a motor vehicle is described in the August 1970 issue of "Popular Science" by Alden P. Armagnac. The design herein presented considers the use of anisotropic material instead of the conventional construction heretofore considered. It is proposed that such material be used in the radial direction, replacing the spokes of the wheel and eliminating the rim.

A hybrid propulsion system is described in the November 1970 issue of "Mechanical Engineering", referring to the work of David W. Rabenhorst. This is similar in concept in that use is made of filamentary materials, such as piano wire, stacked in the shape of a radial bar. While such construction has certain advantages, it has lower energy capacity per unit weight, leads to larger physical size, and presents structural problems inasmuch as all the radial wires must pass through or close to the center line of the shaft.

In transportation systems, practical use has been made of the energy stored in conventional type flywheels where, between stops of a public conveyance vehicle, electrical energy would recharge the wheel, giving it sufficient energy to propel the vehicle to the next charging stop.

SUMMARY OF THE INVENTION

This invention relates to flywheel construction, particularly of the type which is intended for use as an energy storage source. In such capacity the flywheel must be capable of withstanding the stresses imposed by high speed rotation.

Accordingly, it is a primary object of the invention to provide a flywheel which is capable of high speed rotation and efficient storage of the kinetic energy.

It is a particular feature of the invention that means are provided for reducing the stress in the spokes of the wheel produced by the expansion of the rotating rim.

It is a particular advantage of the invention that the flywheel constructed in accordance therewith has a high energy capacity per unit weight.

Other objects, features, and advantages will be apparent from the following description of the invention, pointed out in particularity in the appended claims, and taken in connection with the accompanying drawings, in which:

Figure 1:
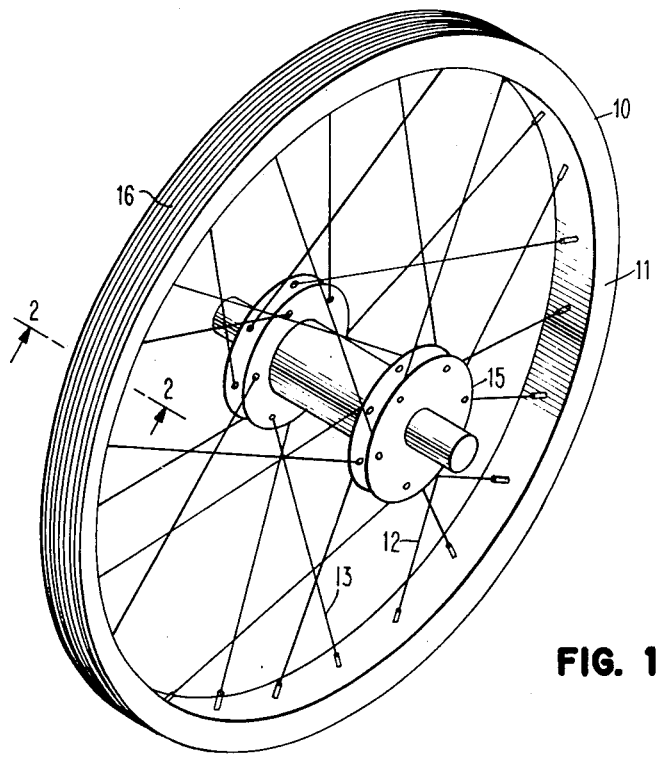
FIG. 1 is a view, in perspective, of a flywheel of the distributed torque, wire-spoke construction, generally referred to as a bicycle wheel.

The following considerations are of interest in connection with the design of an efficient high storage flywheel. It is a well known fact that a flywheel stores energy by virtue of its rotation and inertia. The elementary theory of dynamics shows that the energy E stored in a flywheel is given by:

$$E = \tfrac{1}{2} I w^2 \qquad (1)$$

where I is the moment of inertia of the flywheel and w its angular velocity. For most practical applications, it is desirable to maximize the amount of energy stored for a given weight of the flywheel. The moment of inertia is given by $$E = (W/g) R^2 \qquad (2)$$

where W is the weight of the flywheel, g the gravitational constant (32.2 ft./sec.² approx.) and R is the radius of gyration which depends on the geometry of the flywheel or in other words, on the mass distribution in the flywheel. Using this relationship, the energy stored in the flywheel can be expressed by $$E = \tfrac{1}{2} (W/g) R^2 w^2 \qquad (3)$$

Maximizing the energy capacity of a flywheel of a given weight is equivalent to maximizing the capacity per unit weight of the flywheel which can be called the specific energy capacity and is given by $$e = \tfrac{1}{2} g R^2 w^2 \qquad (4)$$

Thus the problem reduces to the maximizing of the product R which would not have a limit if it were not for the material strength limitations.

The material strength considerations have directed some designers to generate flywheel geometries which lead to uniform stress throughout the flywheel. This approach, however, has two disadvantages. First, it introduces another constraint into the maximization, i.e., the geometry of a solid disk. Second, the imposed geometry creates basically three dimensional stress in the material and thus dictates the use of isotropic materials. It is also known that non-isotropic materials, such as music wire (particularly small diameter wire), and some other fibrous materials exhibit much higher strength in the preferred direction — i.e., longitudinal tension.

It can be shown that using such materials and placing them in a circular rim maximizes the product R $w$. The problem of constructing a practical flywheel utilizing this principle remains. The practical solution thereof, as hereinbelow described, is the salient feature of this invention.

The circular rim can be constructed by winding music wire on a rim-forming support or in the form of a coil without such support. Structurally connecting this rim to a shaft to form a functioning flywheel poses the main problem. It must be borne in mind that this connecting structure must be very light compared to the rim coil, otherwise, it will add more to the weight of the device and thus destroy the maximum R $w$ product. The other problem is that such structure, extending from the center of the shaft to the rim in the rotating device, is not uniformly stressed by the inertia effects. It can be shown that if such structure is made in the form of straight radial spokes constructed of the same material as the rim, the centrifugal effect produces an average expansion of the spokes of approximately one-third that of the expansion of the rim.

Thus in order to maintain structural integrity of the flywheel, the spokes have to be strongly secured to the rim so that the expansion of the rim will provide sufficient pull on the spokes to make them expand proportionally. It can be shown, however, that under such circumstances, the stress in the spokes at the shaft end will exceed the stress in the rim by approximately one-sixth or 16.7 percent. Now the rim must be stressed to the maximum allowable for the material and therefore the spokes will fail. Moreover, the increased tension in the spokes introduces bending stresses in the rim which superimpose on the tensile stress and destroy the uniform stress distribution in the rim.

Such failure and stress effects are prevented, in accordance with the invention, by providing a hub which will allow for expansion of the rim while maintaining the stress in the spokes well under the ultimate value.

In FIG. 1 it is seen that the flywheel 10 is generally based on conventional design, consisting of a rim 11, a plurality of wire spokes arranged in the manner used in bicycle wheel construction, namely, two distinct sets of spokes, some leaning forward, such as, for example, 12, and others leaning backward, such as 13. The spokes are connected to a hub 15 which will be described in more detail in connection with FIGS. 3 and 4.

Figure 2:
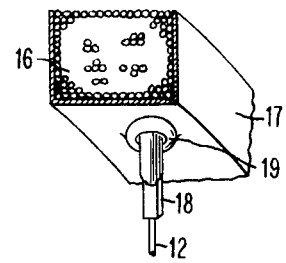
FIG. 2 is a partial sectional view of the rim cut along the line 2—2 of FIG. 1.

As seen in the sectional view of FIG. 2, the rim 10 actually consists of a winding 16 of an anisotropic material, e.g., fine steel wire, generally referred to as "music wire", wound on a preformed support 17. The latter merely forms a frame or support for the coil 16 and, as such, may be any lightweight material, not necessarily of a metallic composition, such as, for example, plastic. The spokes are anchored to the support in the conventional manner by a sleeve nut 18 seated in the receptacle 19 extending into the support 17.

Figure 3:
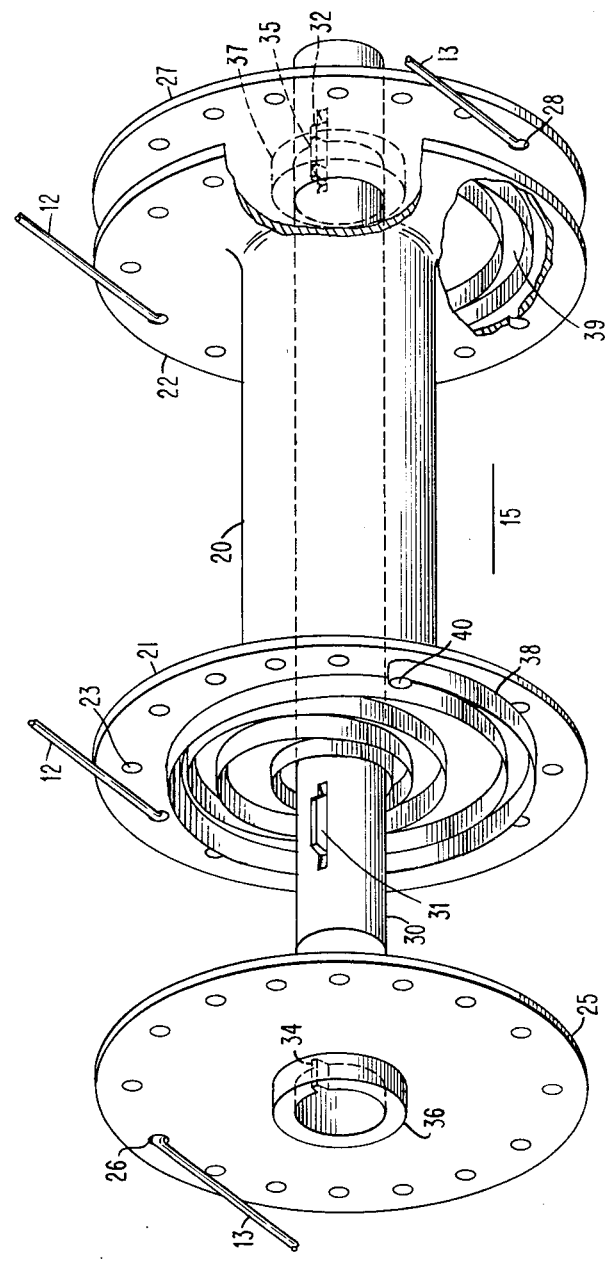
FIG. 3 is an enlarged perspective view of one embodiment of a split hub construction which may be used in connection with the wheel shown in FIG. 1.

Referring to FIG. 3, the enlarged perspective view shows that the hub 15 consists of three distinct coaxially placed components. A central portion 20 terminates at each end in a hub flange 21 and 22, respectively. Both flanges 21 and 22 have a plurality of apertures 23 distributed on the face thereof for the location of the spokes 12 of the wheel 10. The two other components of the hub consist of a hub disk 25 facing the flange 21, having apertures 26 for the location of the spokes 13, and, at the other end of the central portion 20, a hub disk 27 facing the hub flange 22, having apertures 28 for the location of spokes 13.

For the sake of simplifying the illustration, only a portion of one spoke is shown in the respective flanges or disks of the hub structure.

The hub 15 is mounted on a shaft 30 which, in the modification herein shown, has keys 31 and 32 which, when the shaft 30 is fully inserted, meshes with the slots 34 and 35 cut in the bearing supports 36 and 37 of the hub disks 25 and 27, respectively.

By this construction, the hub disks 25 and 27 are directly coupled to the shaft 30, whereas the central portion 20 is free-running. An intercoupling between the shaft 30 and the central portion 15 is achieved by torsion springs 38 and 39 which are anchored at one end to the shaft 30 and at the other end to a suitable pin, such as 40, attached to the hub flange 21. Thus a resilient coupling is provided for the inner portion 20 of the hub 15, permitting angular displacement of the latter with respect to the directly driven outer disks 25 and 27.

Figure 4:
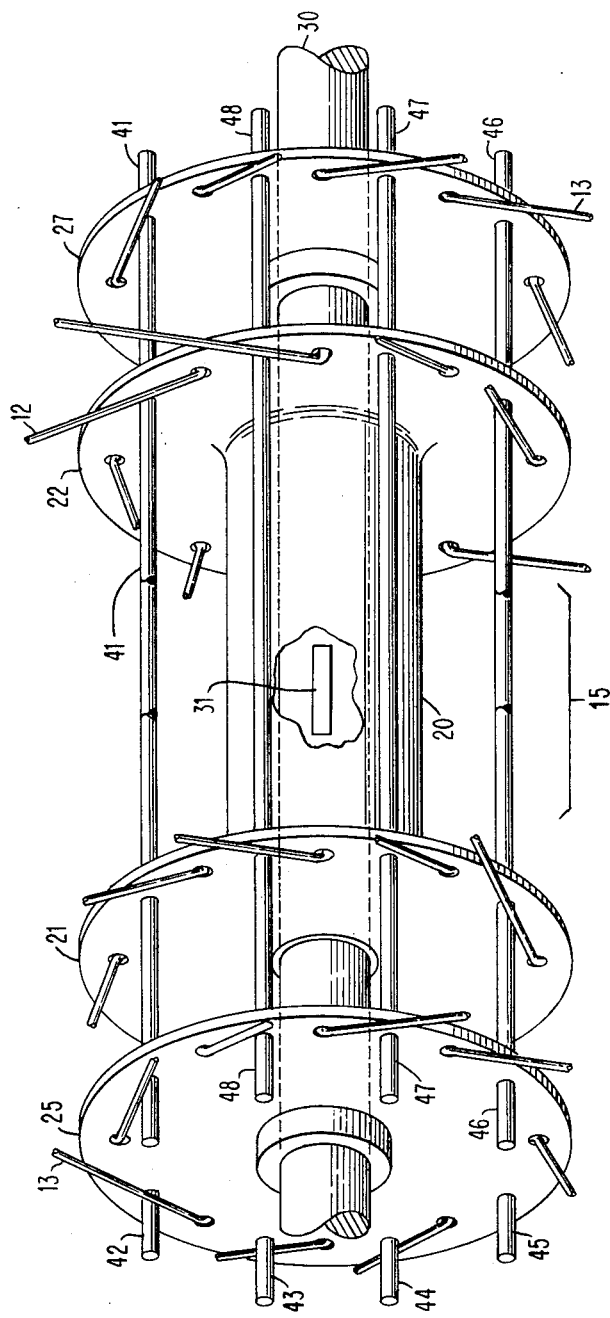
FIG. 4 is another embodiment of a split hub construction which may be used in connection with the wheel shown in FIG. 1.

Referring to FIG. 4, the modified form of the hub 15 is similar in structure to the one described in connection with FIG. 3 and corresponding parts bear the same reference characters. The difference lies in the arrangement of the resilient intercoupling between the central portion 20 and the hub disks 25 and 27. The latter are free running on the shaft 30, whereas the central portion 20 is attached thereto by means of a centrally placed key 31 in the shaft 30.

The resilient intercoupling between the central portion 20 and the disks 25 and 27 is effected by spring rods 41, 42, 43, 44, 45, 46, 47, and 48 which are coaxially placed in suitable apertures in the respective disks 25 and 27 and flanges 21 and 22. This type of coupling has the same function as that provided by the springs 38 and 39 in the embodiment shown in FIG. 3, namely, permitting angular displacement between the central portion 20 of the hub 15 which is directly driven by the shaft 30 and the outer hub disks 25 and 27. The purpose of such resilient intercoupling and the beneficial effect thereof will be fully understood from the following description.

All spokes leaning one way (say forward) are attached to one rigid part of the hub, namely, the hub flanges 21 and 22, while the spokes leaning the other way are attached to the other part of the hub, that is, to the hub disks 25 and 27. In this manner, the tension in the spokes has a force component tangential to the hub 15 and the two sets of spokes tend to turn the two parts of the hub in opposite directions. This effect is balanced by the torsion springs 38 and 39 (FIG. 3) or the spring rods 41 to 48 (FIG. 4) exerting a torque opposing that generated by the tension in the spokes. Now, as the flywheel 10 rotates and the rim 16 expands, the increased tension in the spokes is partly relieved by the mutual rotation of the two parts of the hub. Thus, by properly sizing the rate and the initial preload in the opposing springs, it is possible to prevent the stress in the spokes from approaching their strength limit. The stress in the spokes need to exceed that generated by their own inertia effect only by the small amount necessary to support the static weight of the rim 16. Moreover, this type of construction relieves all spokes uniformly and by exactly the same amount and thus preserves the true circular shape and the balance of the rim 16. In this manner, the split-hub construction described above is superior to the construction employing a unit hub. With careful selection and design of the springs, the construction will result in improved performance for a multitude of applications.

Figure 5:
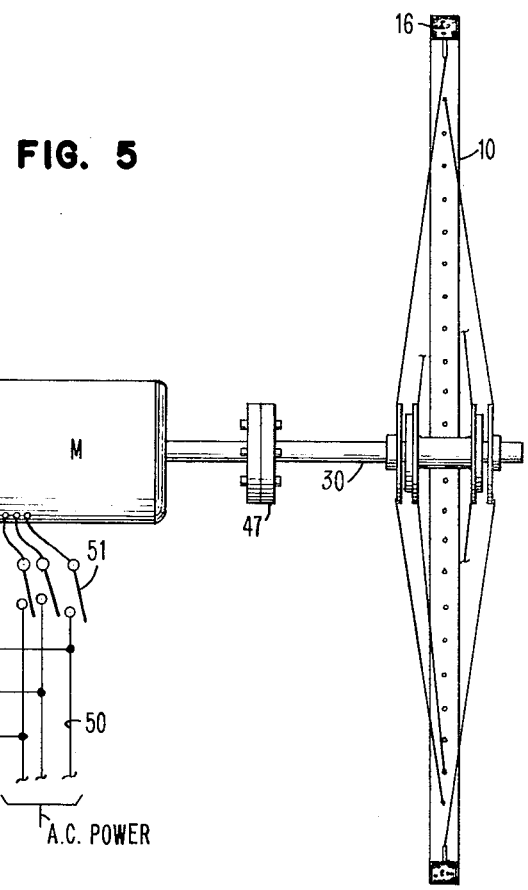
FIG. 5 is a schematic view showing the application of the wheel, depicted in cross section, for the purpose of delivering energy to an electric generator and being driven by a motor for storing the energy.

One practical application of the flywheel herein described, namely, that of a standby generator, by illustrated in FIG. 5. A generator G and a drive motor M, having a common shaft, are interconnected by a coupling 47 with the shaft 30 of the wheel 10. The purpose of the motor M is to energize the wheel from the power source 50 shown here as a three-wire supply. When the switch 51 is closed, the motor is energized and drives the wheel 10 u0 to the designated speed of let us say 20,000 – 40,000 RPM. After the wheel 10 has reached the assigned speed, the switch 51 is disconnected and the switch 52 is closed to the load supply line 53 of the circuit. The generator G is now driven by the wheel 10 and supplies power to the load until such time as the kinetic energy stored therein is dissipated. The load may then be connected to the power source by first opening the switch 52 and then closing the switch 54. At the same time, the motor may again be energized for the recharging of the storage flywheel. Such installations may find wide use as emergency power supplies should there be a failure in the main power supply circuit. For a considerable period of time, depending upon the efficiency and design of the wheel 10, the load circuit may be supplied with power until power failure in the supply circuit is remedied.

The invention in its broader aspects is not limited to the specific embodiments herein shown and described but changes may be made within the scope of the accompanying claims without departing from the principles of the invention and without sacrificing its chief advantages.

What is claimed is:

1. A high energy storage flywheel comprising a rim of anisotropic material, a divided hub having coaxially positioned portions rotationally displaceable with respect to each other, resilient means intercoupling said portions and distinct sets of radial spokes interconnecting said rim with said portions whereby, upon rotation of said wheel, the tension in said spokes produced by the expansion of said rim is compensated by the mutual rotational displacement of said hub portions.

2. In a high energy storage flywheel construction, the combination of a rim, two distinct sets of spokes attached to said rim, a hub divided into coaxially disposed portions comprising a central portion terminating at each end in a hub flange, a pair of hub disks, each facing one of said flanges, respectively, one set of said spokes being attached to said flanges and the other set of said spokes being attached to said disks, a shaft extending into said hub and being keyed to one of said portions and resilient means interconnecting said hub portions.

3. The combination in accordance with claim 2 wherein said shaft is keyed to said hub disks and said resilient means comprise a pair of torsion springs attached at one end to said shaft and at the other end to said flanges, respectively.

4. The combination in accordance with claim 2 wherein said shaft is keyed to said central portion and said resilient means comprise a plurality of coaxially disposed spring rods interconnecting said flanges and said hub disks.

5. The combination in accordance with claim 2 wherein said sets of spokes comprise steel rods, one of which is forward leaning and the other backward leaning, said backward leaning spokes being attached to said flanges and said forward leaning spokes being attached to said hub disks.

6. The combination in accordance with claim 2 wherein said rim consists of a support and layers of a continuous high tensile strength filamentary material, such as music wire, wound thereon.

\* \* \* \* \*